(12) United States Patent
Allen et al.

(10) Patent No.: US 8,051,709 B2
(45) Date of Patent: Nov. 8, 2011

(54) METHOD AND APPARATUS FOR PRE-SPINNING ROTOR FORGINGS

(75) Inventors: Jeffrey Scott Allen, Wilmington, NC (US); Robert Lynn Kesecker, Wilmington, NC (US); James Hamilton Grooms, Fairfield Township, OH (US)

(73) Assignee: General Electric Company, Schenectady, NY (US)

( * ) Notice: Subject to any disclaimer, the term of this patent is extended or adjusted under 35 U.S.C. 154(b) by 395 days.

(21) Appl. No.: 12/392,377

(22) Filed: Feb. 25, 2009

(65) Prior Publication Data

US 2010/0212422 A1 Aug. 26, 2010

(51) Int. Cl.
G01M 1/16 (2006.01)
(52) U.S. Cl. ........................................................ 73/460
(58) Field of Classification Search .............. 73/66, 457, 73/460, 469
See application file for complete search history.

(56) References Cited

U.S. PATENT DOCUMENTS

| | | | |
|---|---|---|---|
| 3,146,623 A | 9/1964 | Ehrsam, Jr. | |
| 3,916,495 A | 11/1975 | Klassen et al. | |
| 4,234,200 A | 11/1980 | Orem et al. | |
| 4,411,715 A | 10/1983 | Brisken et al. | |
| 4,449,966 A * | 5/1984 | Piramoon | 494/20 |
| 4,482,963 A | 11/1984 | Lenahan et al. | |
| 4,566,810 A * | 1/1986 | Yoshioka et al. | 384/280 |
| 4,716,761 A | 1/1988 | Ito | |
| 4,827,197 A | 5/1989 | Giebeler | |
| 5,022,276 A | 6/1991 | Thelen | |
| 5,221,250 A | 6/1993 | Cheng | |
| 5,277,063 A * | 1/1994 | Thomas | 73/457 |
| 5,509,881 A | 4/1996 | Sharples | |
| 5,627,762 A | 5/1997 | Cameron | |
| 5,800,331 A | 9/1998 | Song | |
| 5,895,849 A | 4/1999 | Matteucci | |
| 6,205,405 B1 | 3/2001 | Pouvreau | |
| 6,368,265 B1 | 4/2002 | Barkus et al. | |
| 6,457,941 B1 * | 10/2002 | Larzelere et al. | 416/144 |

(Continued)

FOREIGN PATENT DOCUMENTS

EP 1611976 A1 1/2006

(Continued)

OTHER PUBLICATIONS

"Schenck Spin Test Systems", Schenck Balancing and Diagnostic Systems, www.schenck-usa.com, Feb. 25, 2009, 1 page.

(Continued)

*Primary Examiner* — Max Noori
(74) *Attorney, Agent, or Firm* — William Scott Andes; Steven J. Rosen

(57) ABSTRACT

A method and system for relieving forging induced residual stresses in a rotor forging balances a pre-spin machine with the forging mounted thereon at a first rotational speed and then pre-spins the forging with it mounted on the machine at a substantially greater second rotational speed. A one per rev sensor is used for determining a weight placement angle and a vibration sensor is used for determining an amount of weight to add to a spinning assembly including the forging during the balancing. High-density non-metallic balance weights adhesively attached on an inside surface of the forging or spinning assembly may be used. The rotational inertia of the spinning assembly may be checked during a spin up period by determining a rate of rotational acceleration vs. torque applied to the spinning assembly and used to stop the pre-spinning if it is to great.

25 Claims, 9 Drawing Sheets

U.S. PATENT DOCUMENTS

| | | | |
|---|---|---|---|
| 6,589,151 | B2 | 7/2003 | Akatsu et al. |
| 6,595,052 | B2 | 7/2003 | Wharton |
| 6,679,820 | B2 | 1/2004 | Barkus et al. |
| 6,789,023 | B2 | 9/2004 | Tsai et al. |
| 7,360,993 | B2 * | 4/2008 | Fraenkel ............. 415/232 |
| 7,419,361 | B1 * | 9/2008 | Byam et al. ............. 416/219 R |
| 7,464,577 | B2 | 12/2008 | Habedank et al. |
| 2003/0062304 | A1 | 4/2003 | Sueyoshi |
| 2004/0034483 | A1 | 2/2004 | Sonnichsen et al. |
| 2006/0251507 | A1 | 11/2006 | Braswell |
| 2010/0009833 | A1 * | 1/2010 | Ryu et al. ............. 494/9 |
| 2010/0080705 | A1 * | 4/2010 | Pronovost et al. ............. 416/144 |

FOREIGN PATENT DOCUMENTS

| | | |
|---|---|---|
| FR | 1026815 A | 5/1953 |
| GB | 2173602 A | 10/1986 |
| JP | 9280250 A | 10/1997 |

OTHER PUBLICATIONS

"Schenck Types of Balancing Machines", Schenck Balancing and Diagnostic Systems, www.schenck-usa.com, Feb. 25, 2009, 1 page.
PCT Search Report issued in connection with corresponding U.S. Appl. No. 10/022,674, filed Jan. 30, 2010.
Machine Translation for Abstract of FR Patent No. 1026815.

* cited by examiner

METHOD AND APPARATUS FOR PRE-SPINNING ROTOR FORGINGS

BACKGROUND OF THE INVENTION

1. Technical Field

This invention relates to methods and machines for manufacturing rotors from forging and, more particularly, to pre-spinning rotor forgings to relieve forging induced residual stresses.

2. Background Information

During normal operations gas turbine engines may operate with high rotational speeds and relatively high temperatures. Residual stresses from a metal alloy forging process used in fabricating turbine disks in the engine may relieve during engine operation, such that the turbine disks may undesirably expand. Such disk expansion may adversely affect clearances between the rotor and surrounding casing during engine operation.

In order to reduce occurrences and degree of disk expansion, at least some known engine disks are spun during the manufacturing process in a near-finished condition to relieve the residual stresses in the disk or other rotor forging. This process is known as pre-spinning of the disks generally has the same effect on relieving the residual stress as actual engine operation. Final machining, such as, of mating or other features and/or rabbets, for example, is performed after the pre-spinning process. Conventional pre-spinning processes is a time consuming and costly process. Moreover, because the high rotational speeds are needed to relieve the residual stresses the rotor forging and its mounting fixture must be balanced which increases the complexity of the pre-spin process.

Pre-spin machines provide the capability to spin rotating parts at speeds exceeding aircraft engine core speeds which are about 13,000 RPM. In order for the machine to handle to amount of force generated by the rotating parts unbalance, the rotating part, fixture, alignment, and spindle must be balanced to values typically less than 500 gram-inches using separate balance machines. Pre-spin machines are designed to be operated in a speed range of about 5,000 RPM to 18,000 RPM and balance machines between about 100 RPM and 1200 RPM. Pre-spin machines are intended to hold the part solidly and are typically of the soft-bearing type which means the vibration response changes with increasing speed. Balance machines roll the parts on "knife-edge" bearings and try to maximize unbalance sensitivity within the pedestals holding the bearings. Pre-spin machines are not designed to balance a part, typically they just spin parts to high speeds and are designed to spin parts fast enough for the part to actually fail.

Even if the rotating part and fixture can be balanced separately in a stand-alone balance machine, they must still be aligned properly in the pre-spin machine. If not, reaching proper high speeds may not be attainable. This problem then creates significant cost prior to even pre-spinning the rotating part. Costs may include machining of rotating part to tight tolerances, balancing fixture, properly aligning fixture, and properly aligning pre-spin spindle. If unbalance is still too high, process may have to be repeated many times to be able to achieve pre-spin speeds.

Another problem relates to the wear of the pre-spin machine over time for rotating parts still having high vibration levels. This may cause premature failure of specific components or excessive preventative maintenance costs to prevent these failures. Failure within the pre-spin machine can cause significant damage to the rotating part, fixture, spindle, and machine. Yet another problem with having high unbalance and vibration in the pre-spin machine is the potential for the rotating part to shift within the fixture causing higher vibration during deceleration than during the acceleration to top pre-spin speed. This concern can also cause premature machine failure and rotating part damage.

Thus, it is highly desirable to provide apparatuses and methods that are less expensive and less time consuming machine then conventional machines and methods for balancing and pre-spinning a rotor forging to relieve forging induced stresses at rotational speeds about or above maximum operational speeds of a rotor part manufactured from the rotor forging.

BRIEF DESCRIPTION OF THE INVENTION

A method and system for relieving forging induced residual stresses in a rotor forging balances a pre-spin machine with the forging mounted thereon at a first rotational speed and then pre-spins the forging with it mounted on the machine at a substantially greater second rotational speed. A one per rev sensor is used for determining a weight placement angle and a vibration sensor is used for determining an amount of weight to add to a spinning assembly including the forging during the balancing.

An exemplary method for pre-spinning a rotor forging to relieve forging induced residual stresses in the rotor forging includes, mounting the rotor forging on a pre-spin machine of a pre-spinning system, balancing the pre-spin machine with the rotor forging mounted thereon at a first rotational speed, and pre-spinning the rotor forging while mounted on the pre-spin machine at a second rotational speed substantially greater than the first rotational speed. Using a one per rev sensor for determining a weight placement angle for the balancing of the pre-spin machine with the rotor forging mounted thereon. Using a vibration sensor for determining an amount of weight to add to a spinning assembly including the rotor forging during the balancing. Placing one or more balance weights on an inside surface of the rotor forging or elsewhere on a spinning assembly of the pre-spinning system during the balancing wherein the spinning assembly includes the rotor forging. Using balance weights made of a high-density non-metallic material placed on the inside surface with an adhesive.

A more particular embodiment of the method for pre-spinning further includes the second rotational speed being about an order of magnitude greater than the first rotational speed and more particularly the first rotational speed being in a first rotational speed range between about 100 RPM to 1200 RPM and the second rotational speed being in a second rotational speed range between about 5,000 RPM to 18,000 RPM.

An exemplary method for preventing over spinning includes first determining rotational inertia of a spinning assembly including the rotor forging during a spin up period of the pre-spinning by determining a rate of rotational acceleration vs. torque applied to the spinning assembly and checking the determined rotational inertia against a pre-determined rotational inertia value for the rotor forging. Then stopping the pre-spinning and/or providing the operator with an error message if during the checking the determined rotational inertia exceeds the pre-determined rotational inertia value for the rotor forging.

A pre-spinning system includes a pre-spin machine operable for relieving forging induced residual stresses in a rotor forging, a one per rev sensor for determining a weight placement angle for balancing the pre-spin machine, a vibration sensor to determine an amount of weight to add for balancing the pre-spin machine, a control means for balancing the pre-spin machine and controlling the pre-spin machine during pre-spinning, and the control means operably connected to the vibration and one per rev sensors for receiving signals from the sensors. In a more particular embodiment of the system the pre-spin machine is operable to spin in a rotational speed range between about 5,000 RPM to 18,000 RPM.

An exemplary embodiment of the system further includes the control means having a first controller operable for controlling and displaying rotor speed and vibration level of the pre-spin machine during pre-spinning and a second controller operable for balancing the pre-spin machine before pre-spinning, the first controller being operably connected to the vibration sensor, and the second controller being operably connected to the vibration sensor and one per rev sensors. The rotor forging is mounted to a spindle of the pre-spin machine and one or more balance weights are mounted on an inside surface of the rotor forging or elsewhere on the spinning assembly. The one or more balance weights are made of a high-density non-metallic material stuck on the inside surface of the rotor forging or elsewhere on the spinning assembly with an adhesive.

In another more particular embodiment of the system, the one per rev sensor includes a static pickup co-operable with a rotatable trigger connected to a spindle of the pre-spin machine. The spinning assembly may include a spin arbor connected to a spindle of the pre-spin machine and rotor forging mounted to the spin arbor by a fixture.

The system may further include the control means being operable for determining rotational inertia of a spinning assembly including the rotor forging during a spin up period of the pre-spinning by determining a rate of rotational acceleration vs. torque applied to the spinning assembly and checking the determined rotational inertia against a pre-determined rotational inertia value for the rotor forging. The control means may also be operable for stopping the pre-spinning and/or providing the operator with an error message if during the checking the determined rotational inertia exceeds the pre-determined rotational inertia value for the rotor forging.

DETAILED DESCRIPTION OF THE INVENTION

Figure 1:
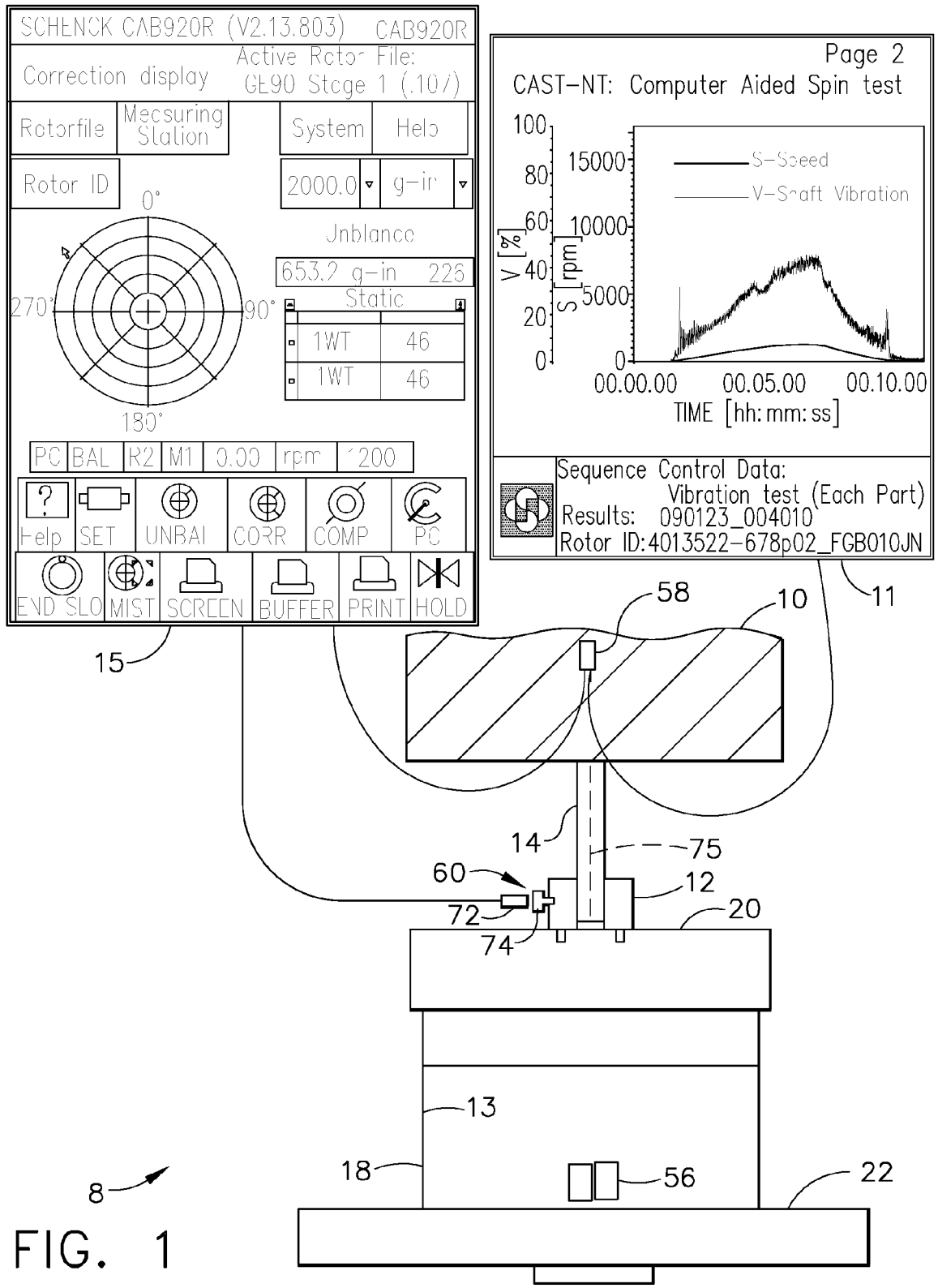
FIG. 1 is an illustration of pre-spin system and machine with a gas turbine engine rotor forging mounted therein and containing a one per rev vibration pickup.

Illustrated in FIG. 1 is a pre-spinning system 8 including an exemplary pre-spin machine 10 having a spin arbor 12 connected to a spindle 14 of the pre-spin machine 10. The spindle 14 has an axis 75 of rotation, is vertically oriented, and is held at some distance from an annular rotor forging 18 as is well known in the art. The spin arbor 12 is attached to a fixture 20 for holding the rotor forging 18 which has an axial bore 13 illustrated in cross-section in FIG. 2. The pre-spin machine 10 includes at least one controller (two are illustrated herein).

Figure 4:
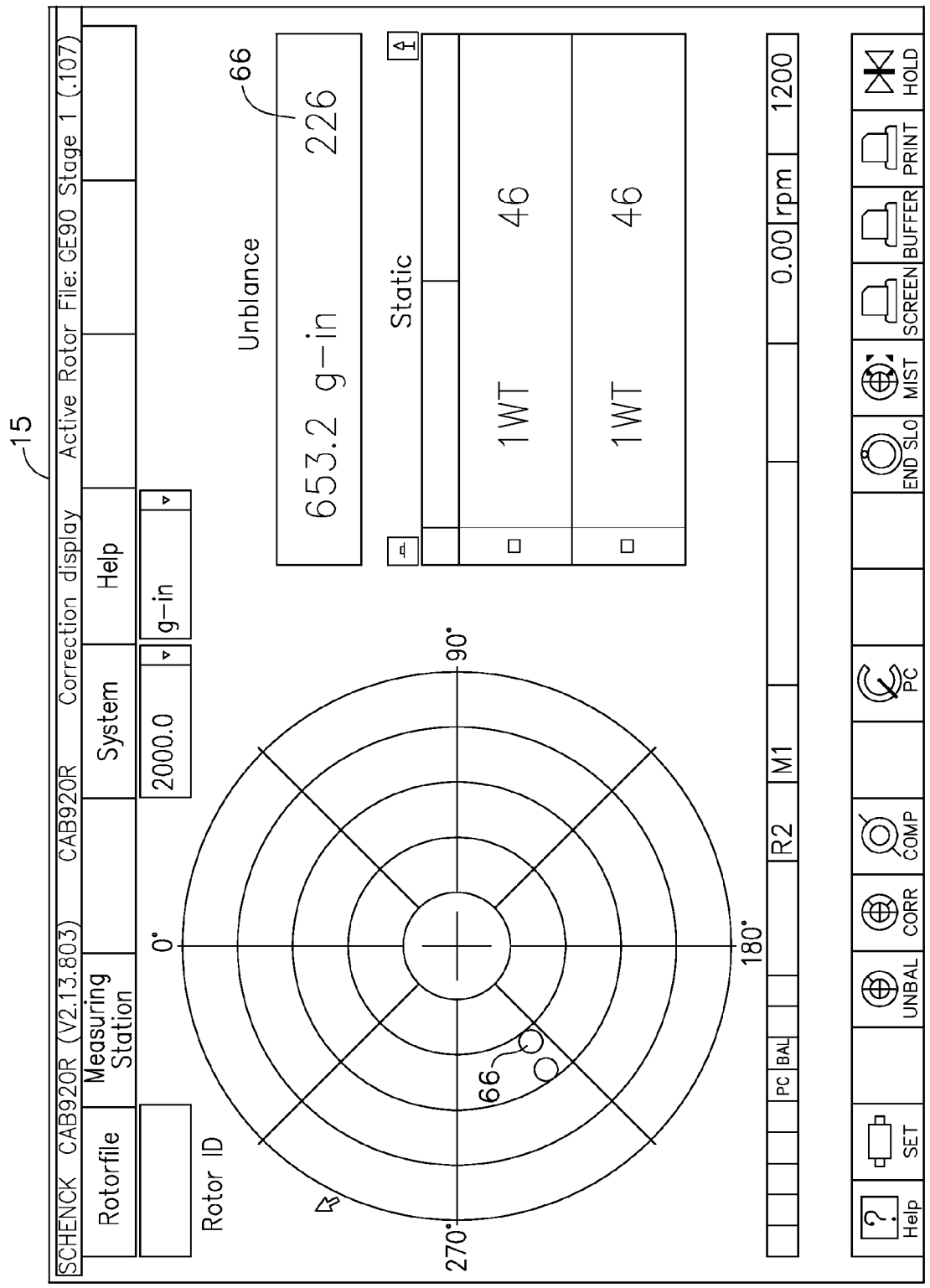
FIG. 4 is an illustration of a display of a second controller for balancing a spinning assembly of the pre-spin system and machine illustrated in FIG. 1.
Figure 5:
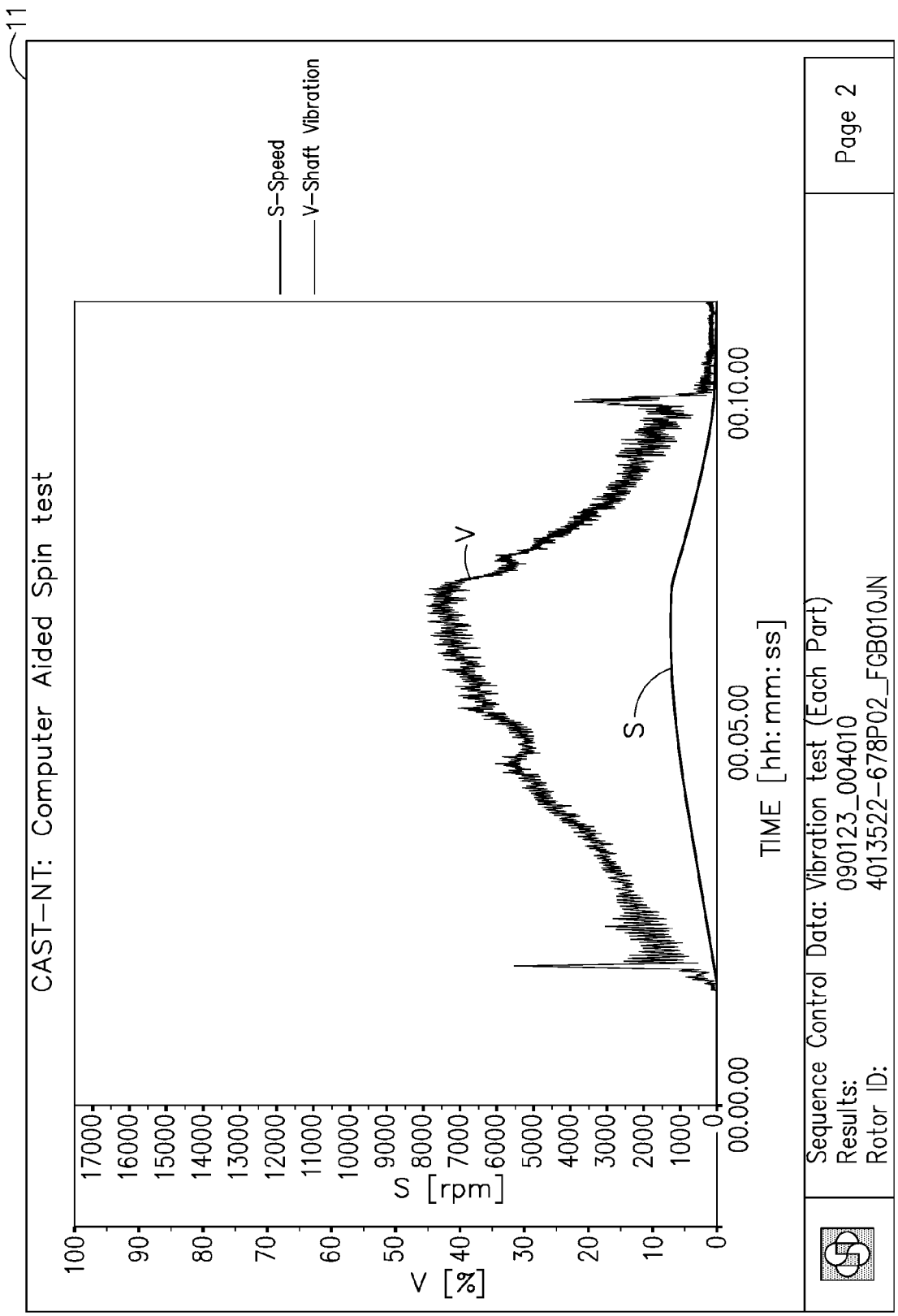
FIG. 5 is an illustration of a display of a first controller for controlling and displaying rotor speed and vibration level of the pre-spin system and machine illustrated in FIG. 1.

The pre-spin machine 10 illustrated herein is unique because it is designed to and is capable of both spinning rotor forgings to very high rotational speeds in ranges between 5,000 RPM to 18,000 RPM in order to relieve forging induced residual stresses in the rotor forgings and balance a spinning assembly 22 which includes the rotor forging 18, spindle 14, spin arbor 12, and the fixture 20 while they are attached to the pre-spin machine 10. The pre-spin machine 10 illustrated herein has a control means for balancing the spinning assembly 22 and pre-spinning the rotor forging 18. An automated checking method and system for assuring that the correct rotor forging was loaded determines the acceleration rate of the spinning assembly 22 including the rotor forging 18 and checking the determined acceleration rate against a predetermined acceleration rate for the rotor forging being pre-spun. The control means illustrated herein includes a first controller 11 for controlling and displaying rotor speed s and vibration level of the pre-spin machine 10 during pre-spinning as illustrated in FIGS. 1 and 5. The control means illustrated herein further includes a second controller 15 for balancing the spinning assembly 22 before pre-spinning it as illustrated in FIGS. 1 and 4.

Figure 2:
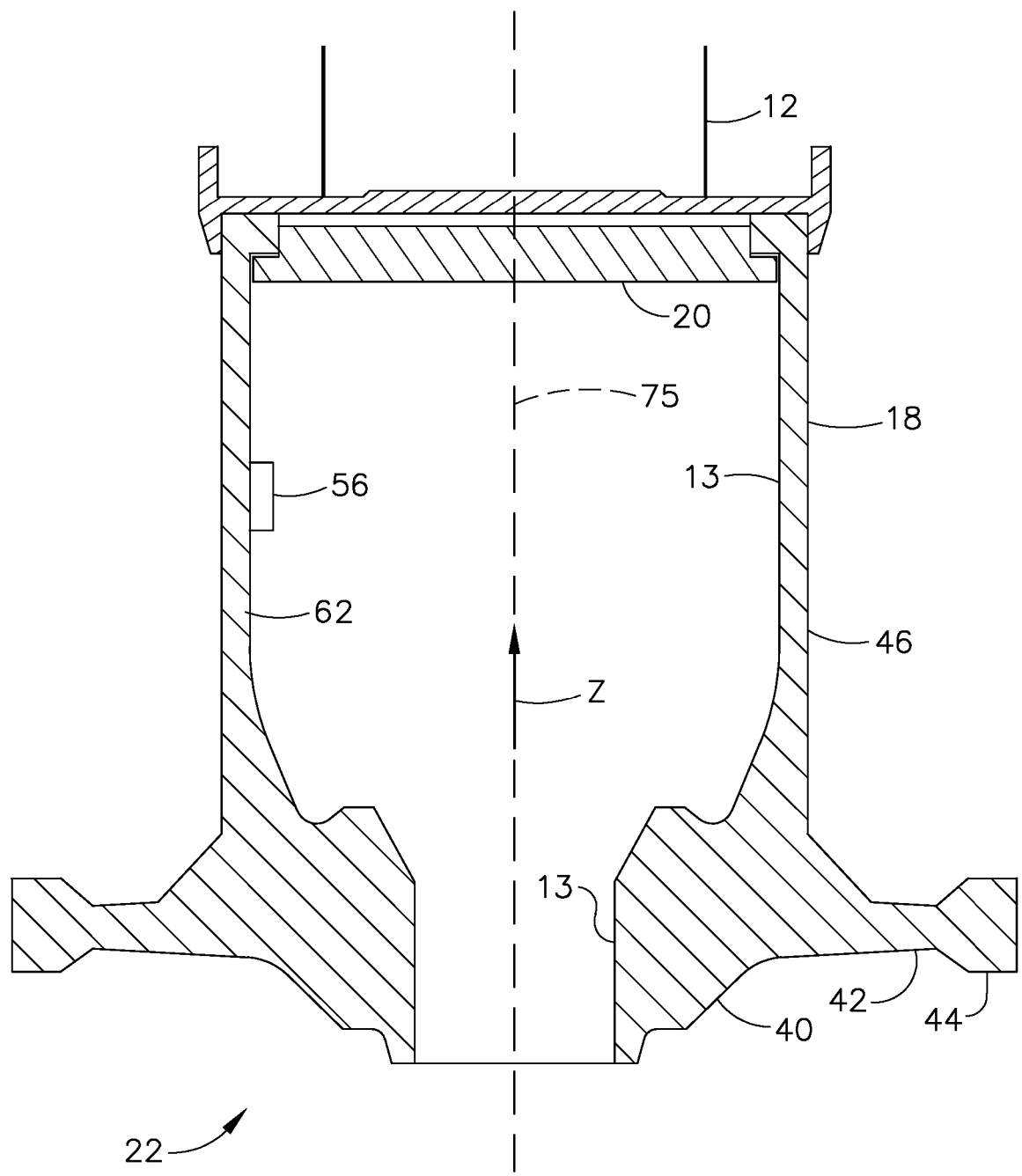
FIG. 2 is a cross-sectional illustration of the gas turbine engine rotor forging illustrated in FIG. 1.
Figure 3:
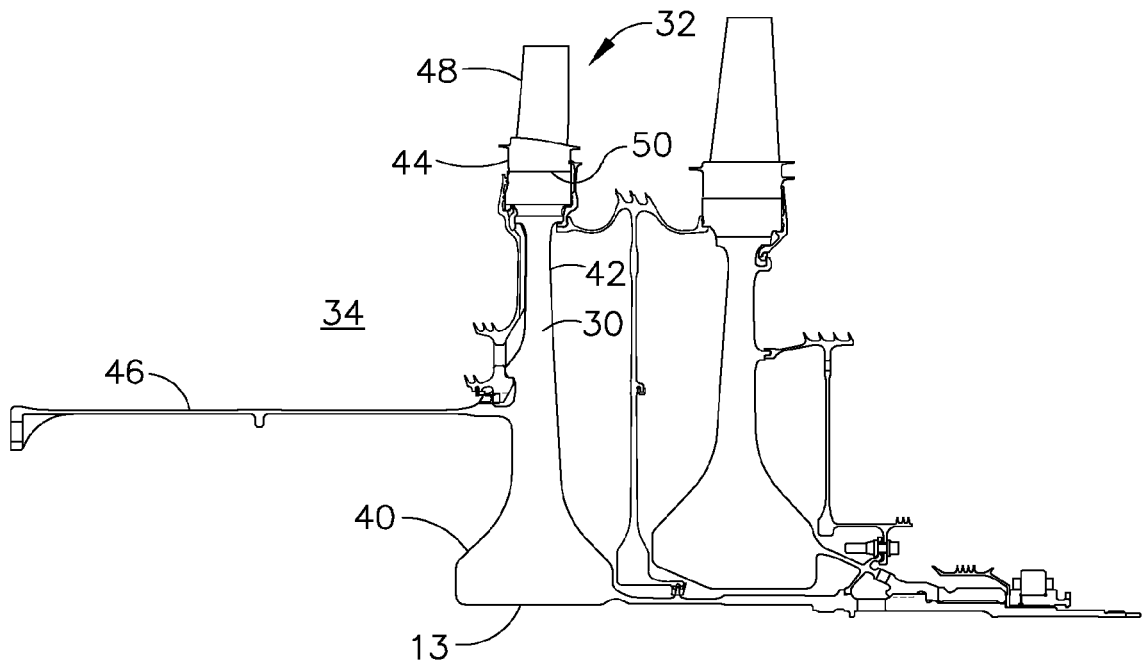
FIG. 3 is a cross-sectional illustration of a turbine rotor made from the gas turbine engine rotor forging illustrated in FIG. 1.
Figure 3:
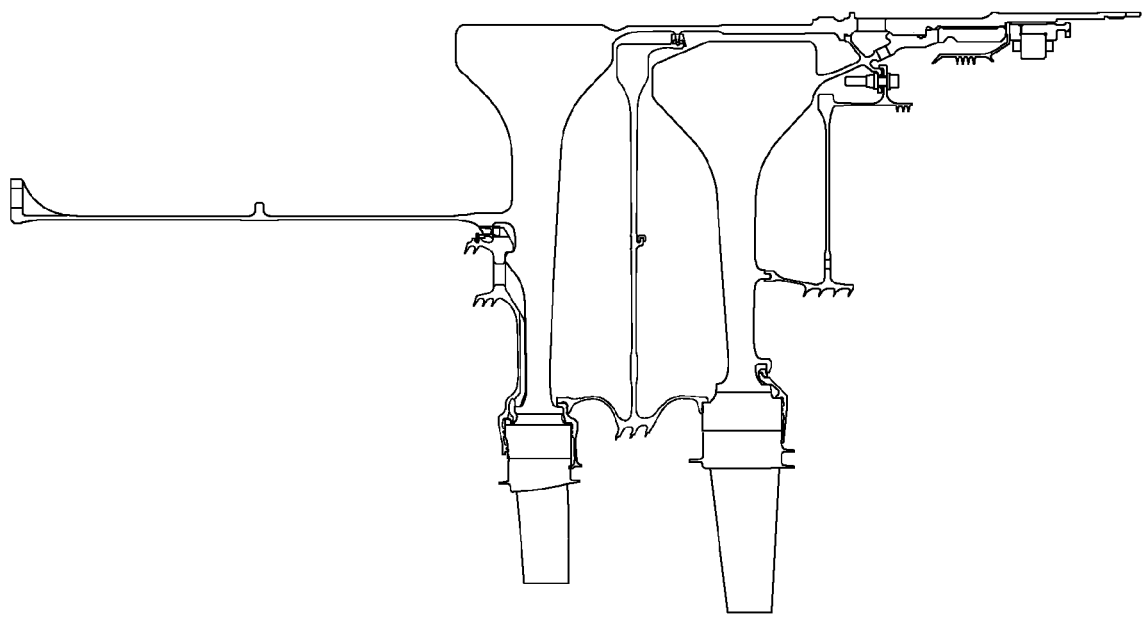

The exemplary rotor forging 18 illustrated herein is used to form a disk 30 of a first stage 32 of a high pressure turbine 34 as illustrated in FIG. 3 and which may be found in an aircraft high bypass ration gas turbine engine. The rotor forging 18 illustrated in FIG. 2 is near net shape and includes various features corresponding to final machined features of the disk 30 illustrated in FIG. 3. These features include the bore 13, hub 40, web 42, rim 44, and cylindrical arm 46. Turbine blades 48 are mounted in slots 50 machined in the rim 44 of the disk 30 after the rotor forging 18 is spun to relieve the forging induced residual stresses.

The pre-spinning system 8 may incorporate a commercially available pre-spin machine 10. One exemplary pre-spin machine 10 is a Schenck Trebel Pre-Spin Machine which includes a M385 controller serving as the first controller 11 for controlling and displaying rotor speed s and vibration level v of the pre-spin machine 10. The Schenck Trebel Pre-Spin Machine and M385 controller are well known in the industry for use in pre-spin systems. The second controller 15, such as a CAB920 controller available from Schenck illustrated in FIG. 4, is used to balance the spinning assembly 22 by determining how much weight or how many balance weights 56 to add to the spinning assembly 22, as illustrated in FIGS. 1 and 2, and at what weight placement angle 66 as illustrated in FIG. 4. The pre-spinning system 8 and method of balancing the spinning assembly 22 uses the pre-spin machine's existing vibration sensor 58 and an additional one per rev sensor 60 a illustrated in FIG. 1. Pre-spinning uses the pre-spin machine's vibration sensor 58 to warn and/or avoid excessive or dangerous vibrations during the high rotational speed pre-spinning.

The one per rev sensor 60 is used to determine a base angle from which the weight placement angle 66 is determined and the machine's vibration sensor 58 is used to determine how much weight or how many balance weights 56 to add to the spinning assembly 22 during balancing. The one per rev sensor 60 illustrated herein includes a static pickup 72 and a rotating trigger 74 set on a known angle of on the spinning assembly 22. The static pickup 72 illustrated herein is a capacitance probe and the rotating trigger 74 is a bolt screwed into the spin arbor 12. The capacitance probe detects the bolt every revolution and send the signal to the controller to help determine the weight placement angle 66. Other types of static pickups 72 include vibration sensors, proximity switches, or light sensors. Besides the bolt, other types of triggers include set screws, reflective tape, and reflective spots.

The weight placement angle 66 is where the controller instructs the operator to place the balance weights 56. The balance weights 56 are preferably placed on an inside surface 62 of the rotor forging 18 but may be placed elsewhere on the spinning assembly 22.

The balance weights 56 are preferably not metallic pieces due to potential failure of the metal at high pre-spin speeds greater than 15,000 RPM and resulting damage that may occur on the hardware. A high-density non-metallic material is recommended instead. The non-metallic material is such that it may be stuck on the inside surface 62 of the rotor forging 18 or the spinning assembly 22 or rotating part or assembly with adhesive to prevent it from slipping. At high speeds, the non-metallic material is forced outwardly against the inside surface 62 and will stay in place if on a surface parallel to the angle of rotation.

The controller is programmed to perform a Fourier analysis on a vibration signal from the vibration sensor 58 in the pre-spin machine 10 and the a one per rev signal from the one per rev sensor 60. The result is instructions from the controller for how much or how many balance weights 56 to add to the spinning assembly 22 and at what weight placement angle 66 or at what angular location around the rotor forging 18 or elsewhere on the spinning assembly 22 as illustrated in FIG. 4.

Each separate rotor forging 22 must be balanced before it is pre-spun. A calibration process used for the balancing method developed for the pre-spinning system 8 illustrated herein is an iterative process. Each separate rotor forging 18 is balanced before pre-spinning but calibration for the type of part or rotor forging is calibrated usually only once. For example all of the rotor forgings 18 for first stages 32 of high pressure turbines 34 must be balanced and may use a single calibration for that type of part, namely the rotor forging 18 for a first stage 32 of a high pressure turbine 34 for a particular type of engine, e.g. a GE90.

The calibration is performed initially with a test weight to determine a magnitude of unbalance (in gram-inches) correlating to magnitude of vibration (% vibration level or mils of vibrations) using the first controller 11 illustrated in FIG. 5. A phase angle is also determined relative to a signal transmission from the one per rev sensor 60 using the second controller 15 to determine location of weight placement. Since the vibration causes bending within the components (spindle, fixture, rotating part), the magnitude of unbalance (gram-inches) per vibration level may vary. To optimize this correlation, the sensitivity is set at the most common unbalance seen by the assembly.

A non-linear calibration may be used to calibrate the system 8 for balancing. For a linear calibration the second controller 15 incorporating a linear calibration would call for incremental weights in for example grams (at a predetermined radius R at a predetermined location Z along the axis 75 of rotation of the spindle 14 of the pre-spin machine 10 for incremental vibration levels. Using the non-linear calibration for balancing calls for non-incremental weights to be added for incremental vibration levels.

A non-linear calibration may be used to calibrate the system 8 for balancing. For a linear calibration the second controller 15 incorporating a linear calibration would call for incremental weights in for example grams (at a predetermined radius R at a predetermined location Z along an axis 75 of rotation of the spindle 14 of the pre-spin machine 10 for incremental vibration levels. Using the non-linear calibration for balancing calls for non-incremental weights to be added for incremental vibration levels.

The non-linear calibration is an iterative process. Thus for higher vibration levels, the calibration constant requires less mass or weights per vibration level than at lower vibration levels. An example of using a non-linear calibration method results in instructions displayed to the operator of the pre-spin machine 10 as follows:

The number of weights determined by the second controller 15 based on linear calibration determines the number of weights the operator is instructed to install using the non-linear calibration as follows:

if 5, install 4
if 4, install 3
if 3, install 3
if 2, install 3
if 1, install 2

Figure 6:
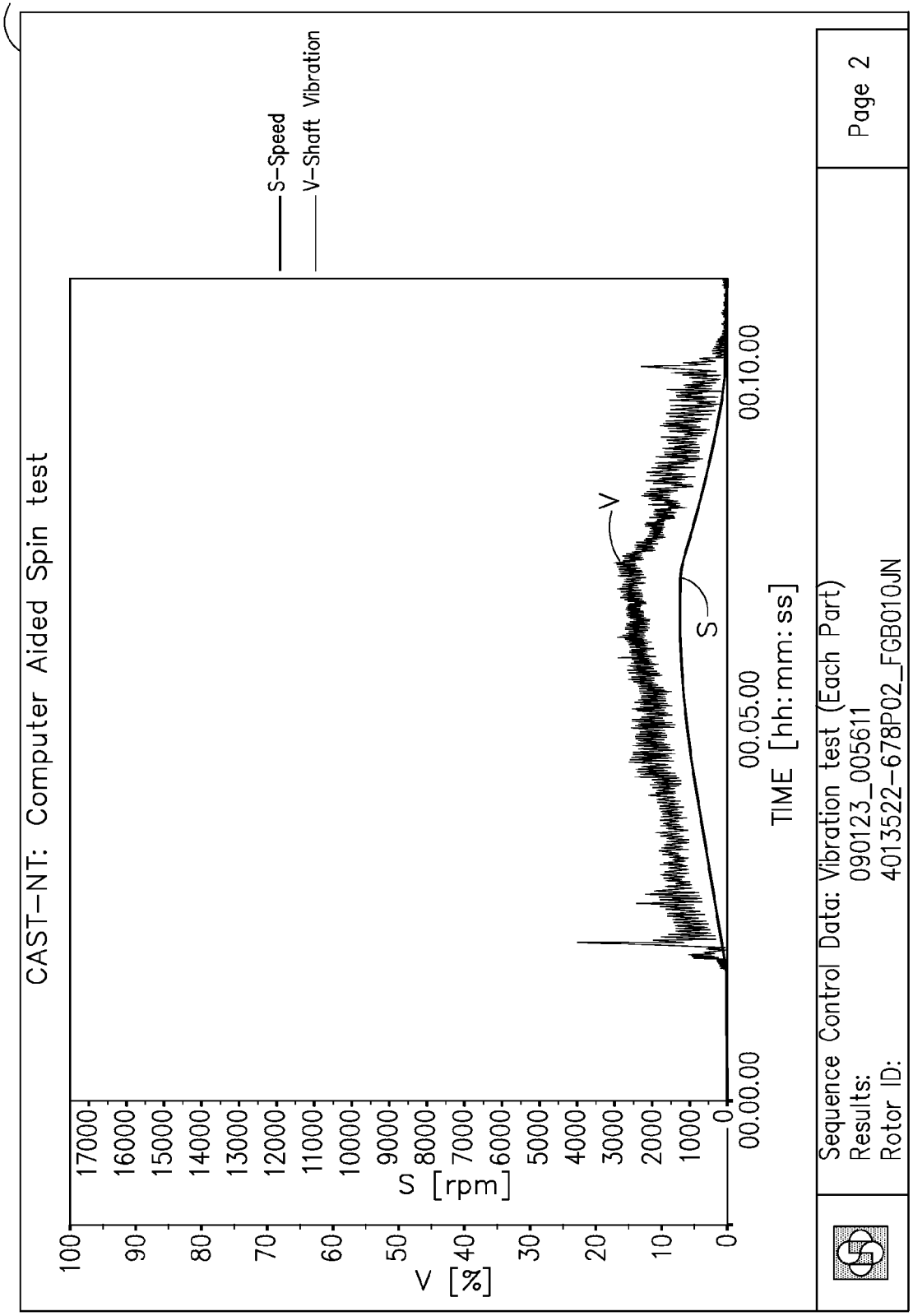
FIG. 6 is an illustration of the display of the first controller after balancing the pre-spin system and machine illustrated in FIG. 1.
Figure 7:
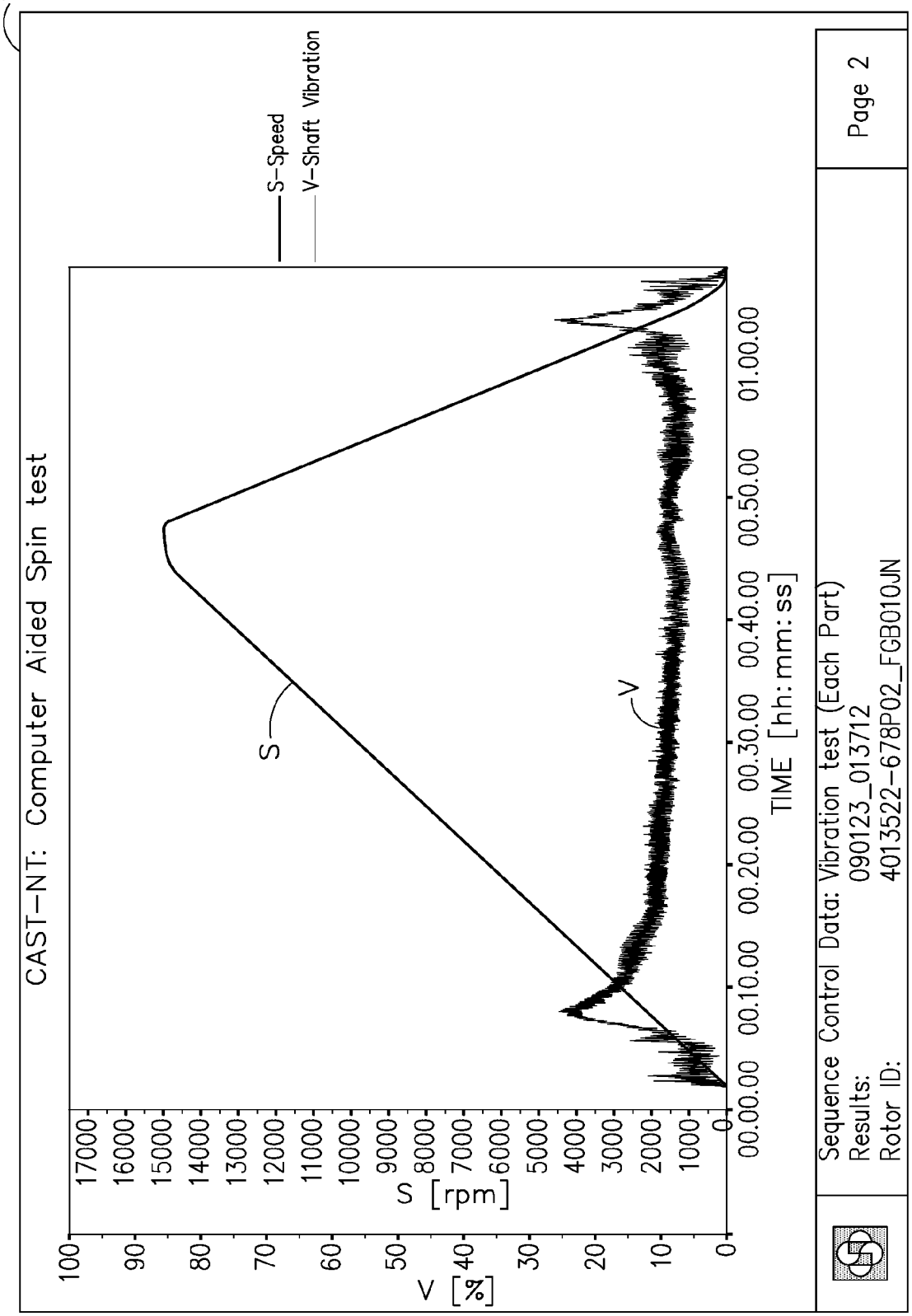
FIG. 7 is an illustration of the display of the first during a pre-spinning run of the pre-spin system and machine illustrated in FIG. 1.

The non-linear calibration typically results in less balancing runs and time needed to balance the rotor forging 18. Illustrated in FIGS. 5 and 6 are examples of vibration levels before and after a single calibration run illustrating the speed and usefulness of the non-linear calibration method. The non-linear calibration is stored in the second controller 15 and used for balancing each rotor forging 18 of the same type such as those having the same part number. The effectiveness of this method is further illustrated in FIG. 7 which illustrates a pre-spinning run at very high rotational speeds while maintaining low acceptable vibrations.

As noted above, the pre-spin process requires high rotational speeds to eliminate forging induced residual stresses. In the aircraft gas turbine industry, this process is used on several different rotors for varying speeds. If a rotor is incorrectly run to a different rotor program that requires a higher speed, there is a risk of damage to the rotor, tooling, and pre-spin machine. This problem is currently addressed manually. The operator is required to load the correct program, and to load the correct rotor with the program. There is no on-machine check to assure that the correct rotor has been loaded.

Figure 8:
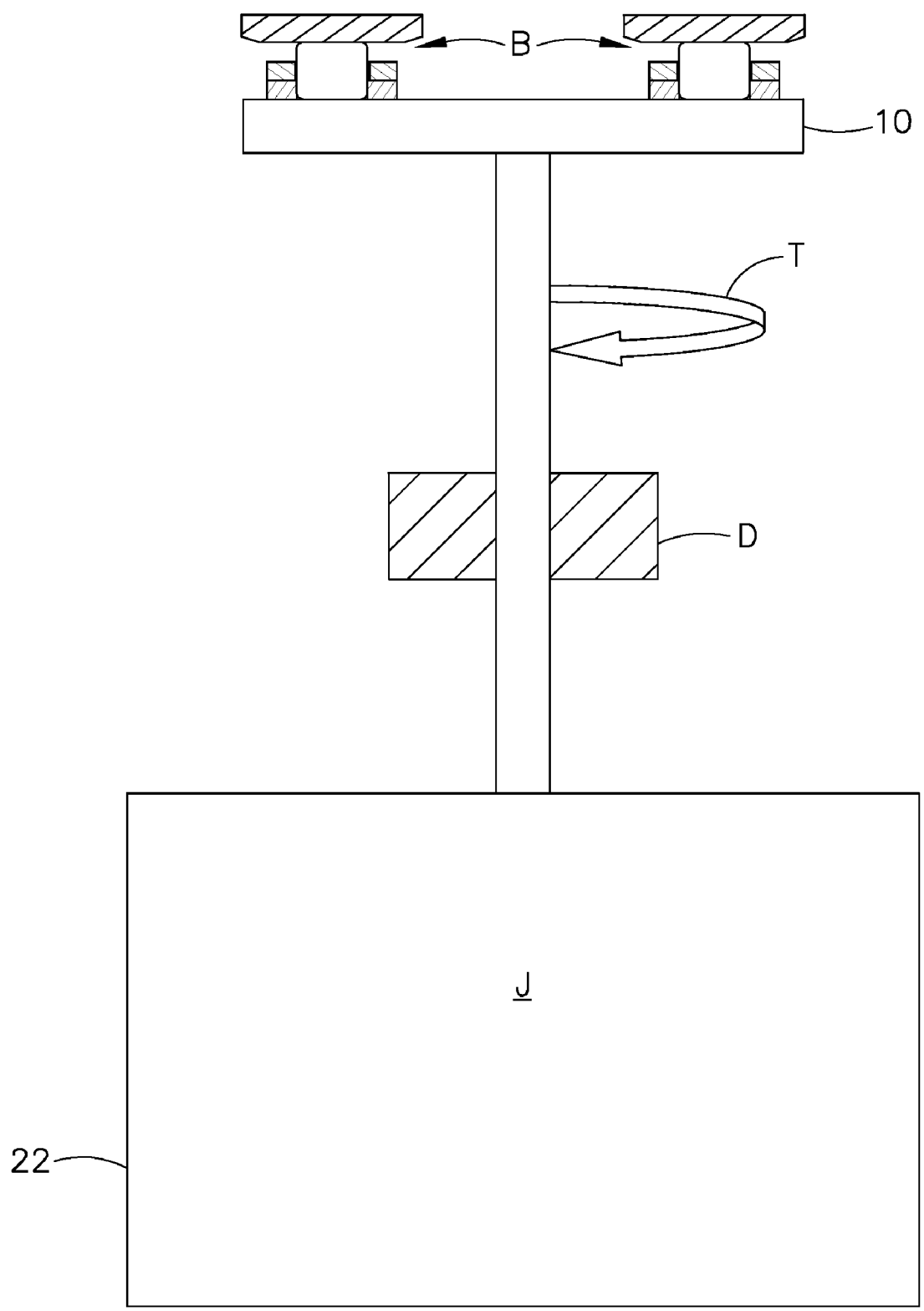
FIG. 8 is a schematic illustration of a kinematic model of the pre-spin machine and a spinning assembly including the gas turbine engine rotor forging mounted therein.

The exemplary method of balancing the spinning assembly 22 and pre-spinning the rotor forging 18 incorporates an automated checking method and system for assuring that the correct rotor forging was loaded by checking the acceleration rate of the rotor forging. A kinematic model of the spinning assembly 22 including the rotor forging 18 is illustrated in FIG. 8. Each rotor forging has a unique rotational inertia J so a given torque T for each rotor forging will accelerate different rotor forgings at different rates.

Figure 9:
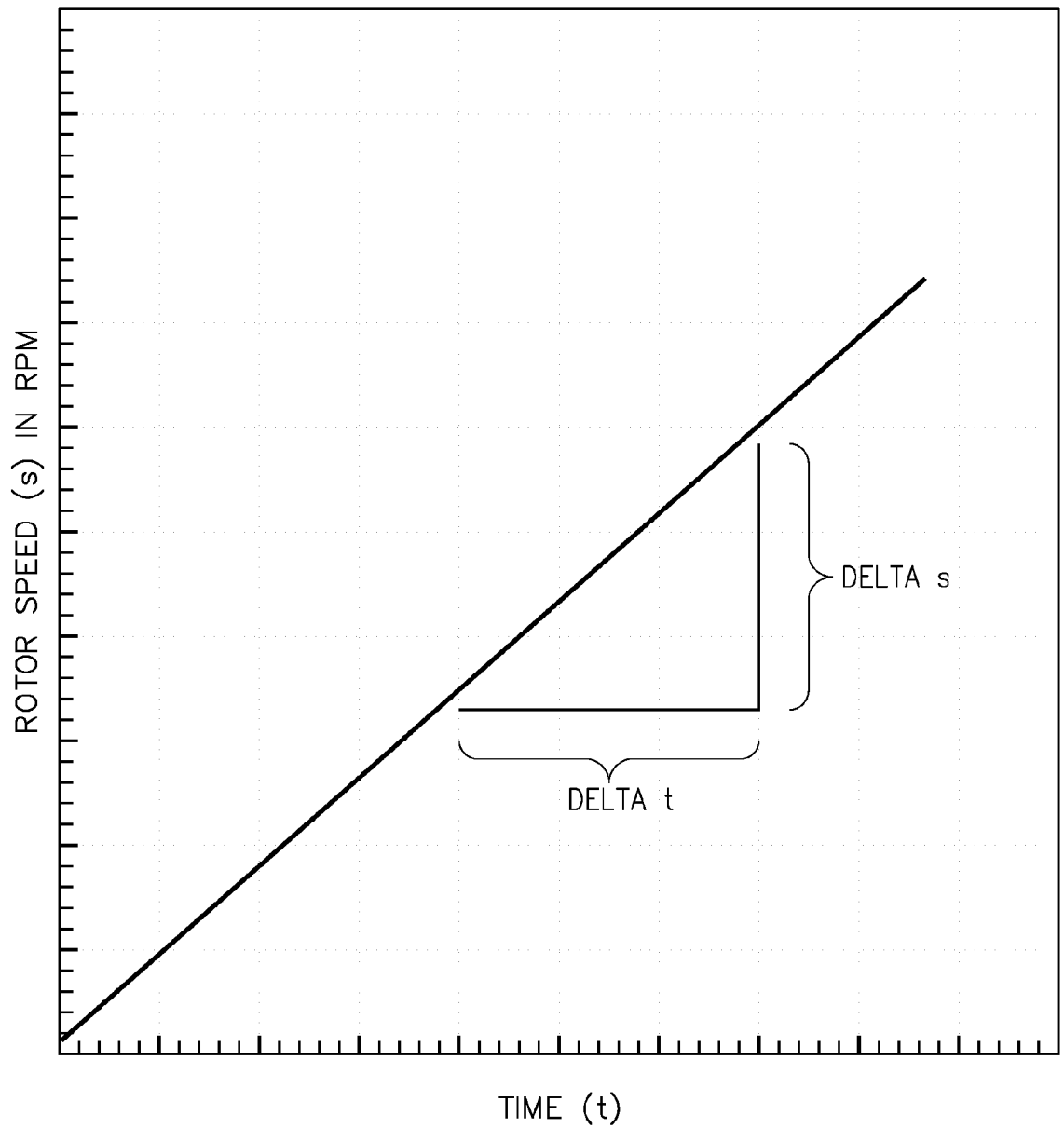
FIG. 9 is a graphic illustration of rotor speed acceleration versus time for the spinning assembly including an exemplary gas turbine engine rotor forging.

The rotational inertia J times rotor speed acceleration rate A equals the torque T minus losses L of the kinematic model illustrated in FIG. 8. Losses L include losses caused by vibration through the damper D and bearing drag of the bearings B illustrated in the model and may be represented by equation 1, J×A=T−L. The losses L can be ignored if the losses are low, or very consistent between rotor forgings and thus equation 1 may be reduced to equation 2, J×A=T. Thus, the rotational inertia J is equal to torque T divided by the rotor speed acceleration rate A. The rotor speed acceleration rate A for the rotor forging 18 mounted on the pre-spin machine 10 is derived from information from the pre-spin machine 10 through its controller. This information is a function of rotor speed s of the spinning assembly 22 over time t that the rotor speed s is measured. As the pre-spin machine 10 is accelerated the rotor speed s of the spinning assembly 22 changes over time t. The rotor speed acceleration rate A is equal to a rotor speed change DELTA s divided by a time interval DELTA t as expressed in equation 3, A=(DELTA s)/(DELTA t) as illustrated in FIG. 9.

The checking system automatically calculates rotational inertia by checking the rate of rotational acceleration vs. torque applied to the rotor forging. The calculated rotational inertia is then checked against a pre-determined and stored required value for the program being executed. If the rotational inertial does not match the stored required value for the program being executed, the machine will safely stop the program and provide the operator with an error message. The checking system may use one of the controllers to automatically calculate the rotational inertia and check is against the pre-determined stored required value for the program being executed.

While there have been described herein what are considered to be preferred and exemplary embodiments of the present invention, other modifications of the invention shall be apparent to those skilled in the art from the teachings herein and, it is therefore, desired to be secured in the appended claims all such modifications as fall within the true spirit and scope of the invention. Accordingly, what is desired to be secured by Letters Patent of the United States is the invention as defined and differentiated in the following claims.

What is claimed:

1. A method for pre-spinning a rotor forging to relieve forging induced residual stresses in the rotor forging, the method comprising:
   mounting the rotor forging on a pre-spin machine of a pre-spinning system,
   balancing the pre-spin machine with the rotor forging mounted thereon at a first rotational speed, and
   pre-spinning the rotor forging to relieve forging induced residual stresses in the rotor forging while mounted on the pre-spin machine at a second rotational speed substantially greater than the first rotational speed.

2. A method as claimed in claim 1 further comprising using a one per rev sensor for determining a weight placement angle for the balancing of the pre-spin machine with the rotor forging mounted thereon.

3. A method as claimed in claim 2 further comprising using a vibration sensor for determining an amount of weight to add to a spinning assembly including the rotor forging during the balancing.

4. A method as claimed in claim 3 further comprising placing one or more balance weights on an inside surface of the rotor forging or elsewhere on a spinning assembly of the pre-spinning system during the balancing wherein the spinning assembly includes the rotor forging.

5. A method as claimed in claim 4 further comprising using balance weights made of a high-density non-metallic material placed on the inside surface with an adhesive.

6. A method as claimed in claim 1 further comprising determining rotational inertia of a spinning assembly including the rotor forging during a spin up period of the pre-spinning by determining a rate of rotational acceleration vs. torque applied to the spinning assembly and checking the determined rotational inertia against a pre-determined rotational inertia value for the rotor forging.

7. A method as claimed in claim 6 further comprising stopping the pre-spinning and/or providing the operator with an error message if during the checking the determined rotational inertia exceeds the pre-determined rotational inertia value for the rotor forging.

8. A method as claimed in claim 1 further comprising the second rotational speed being about an order of magnitude greater than the first rotational speed.

9. A method as claimed in claim 1 further comprising the first rotational speed being in a first rotational speed range between about 100 RPM to 1200 RPM and the second rotational speed being in a second rotational speed range between about 5,000 RPM to 18,000 RPM.

10. A method as claimed in claim 9 further comprising using a one per rev sensor for determining a weight placement angle for balancing the pre-spin machine with the rotor forging mounted thereon.

11. A method as claimed in claim 10 further comprising using a vibration sensor to determine an amount of weight to add to a spinning assembly including the rotor forging during the balancing.

12. A method as claimed in claim 11 further comprising placing one or more balance weights on an inside surface of the rotor forging or elsewhere on a spinning assembly of the pre-spinning system during the balancing wherein the spinning assembly includes the rotor forging.

13. A method as claimed in claim 12 further comprising using balance weights made of a high-density non-metallic material placed on the inside surface with an adhesive.

14. A method as claimed in claim 9 further comprising determining rotational inertia of a spinning assembly including the rotor forging during a spin up period of the pre-spinning by determining a rate of rotational acceleration vs. torque applied to the spinning assembly and checking the determined rotational inertia against a pre-determined rotational inertia value for the rotor forging.

15. A method as claimed in claim 14 further comprising stopping the pre-spinning and/or providing the operator with an error message if during the checking the determined rotational inertia exceeds the pre-determined rotational inertia value for the rotor forging.

16. A pre-spinning system comprising:
   a pre-spin machine operable for relieving forging induced residual stresses in a rotor forging,
   a one per rev sensor for determining a weight placement angle for balancing the pre-spin machine,
   a vibration sensor to determine an amount of weight to add for balancing the pre-spin machine,
   a control means for balancing the pre-spin machine and controlling the pre-spin machine during pre-spinning for relieving forging induced residual stresses in a rotor forging, and
   the control means operably connected to the vibration and one per rev sensors for receiving signals from the sensors.

17. A system as claimed in claim 16 further comprising:
   the control means including a first controller operable for controlling and displaying rotor speed and vibration level of the pre-spin machine during pre-spinning and a second controller operable for balancing the pre-spin machine before pre-spinning, the first controller operably connected to the vibration sensor, and the second controller operably connected to the vibration sensor and one per rev sensors.

18. A system as claimed in claim 16 further comprising a spinning assembly including the rotor forging mounted to a spindle of the pre-spin machine and one or more balance weights mounted on an inside surface of the rotor forging or elsewhere on the spinning assembly.

19. A system as claimed in claim 18 further comprising the one or more balance weights made of a high-density non-metallic material stuck on the inside surface of the rotor forging or elsewhere on the spinning assembly with an adhesive.

20. A system as claimed in claim 16 further comprising the pre-spin machine being operable to spin in a rotational speed range between about 5,000 RPM to 18,000 RPM.

21. A system as claimed in claim 16 further comprising the control means being operable for determining rotational inertia of a spinning assembly including the rotor forging during a spin up period of the pre-spinning by determining a rate of rotational acceleration vs. torque applied to the spinning assembly and checking the determined rotational inertia against a pre-determined rotational inertia value for the rotor forging.

22. A system as claimed in claim 21 further comprising the control means being operable for stopping the pre-spinning and/or providing the operator with an error message if during the checking the determined rotational inertia exceeds the pre-determined rotational inertia value for the rotor forging.

23. A system as claimed in claim 16 further comprising the one per rev sensor including a static pickup co-operable with a rotatable trigger connected to a spindle of the pre-spin machine.

24. A system as claimed in claim 16 further comprising a spinning assembly including a spin arbor connected to a spindle of the pre-spin machine and rotor forging mounted to the spin arbor by a fixture.

25. A system as claimed in claim 24 further comprising the one per rev sensor including a static pickup and a rotatable trigger mounted on the spinning assembly.

* * * * *